March 9, 1926.  1,575,933
B. A. PETERSON ET AL
WARPING APPARATUS
Filed Dec. 31, 1923  4 Sheets-Sheet 1
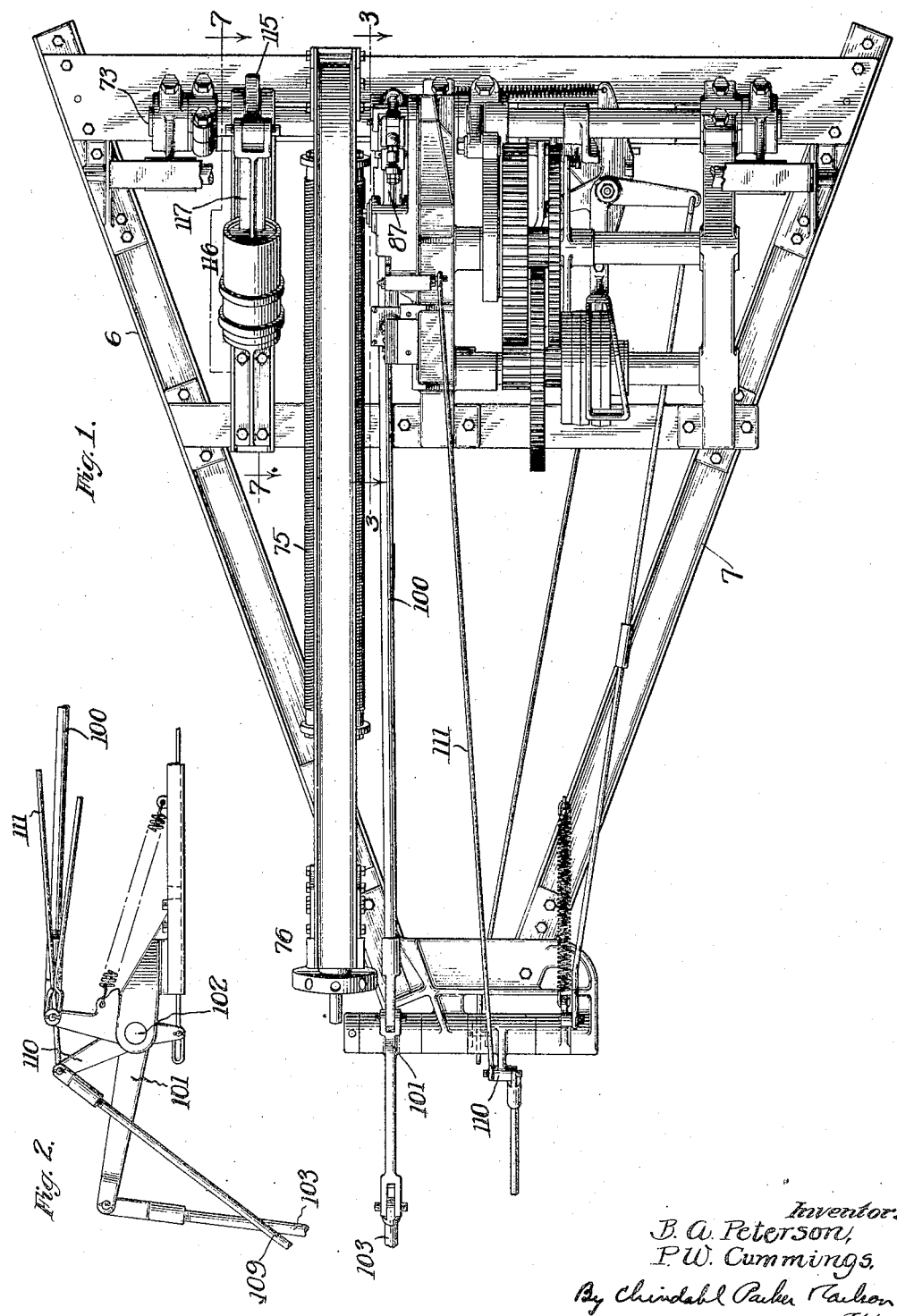
Inventors:
B. A. Peterson,
P. W. Cummings,
By Chindahl Parker Carlson
Attys.

March 9, 1926.
B. A. PETERSON ET AL
WARPING APPARATUS
Filed Dec. 31, 1923   4 Sheets-Sheet 2
1,575,933
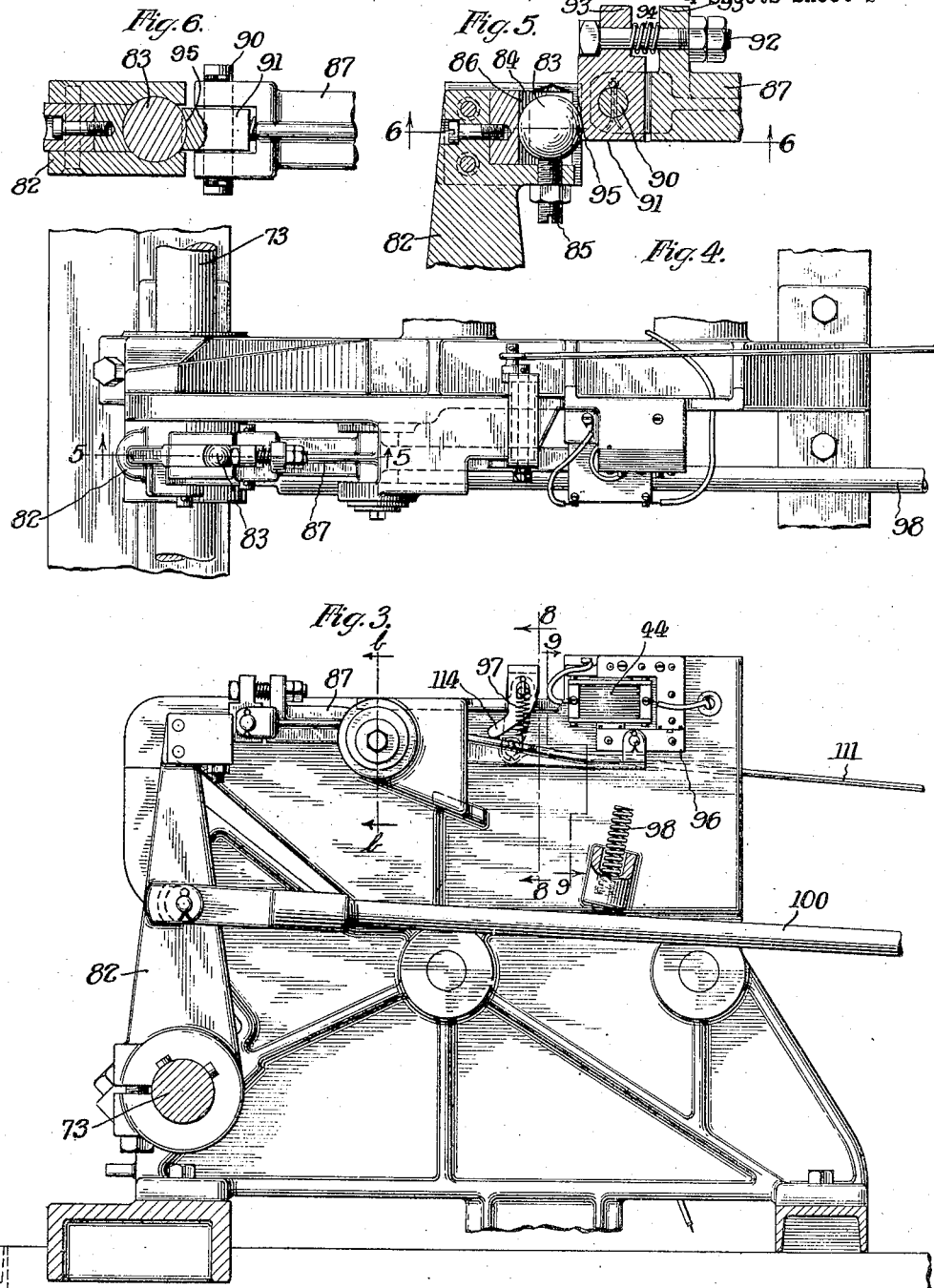
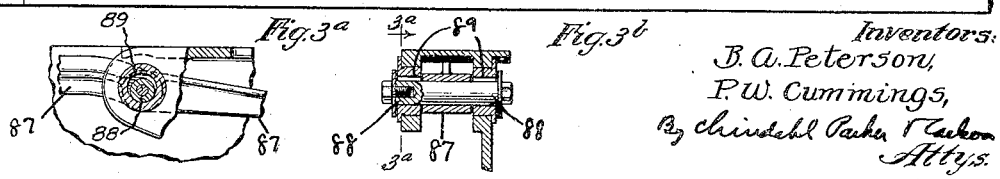
Inventors:
B. A. Peterson,
P. W. Cummings,
By Chindahl Parker & Jackson
Attys.

March 9, 1926.

B. A. PETERSON ET AL 1,575,933

WARPING APPARATUS

Filed Dec. 31, 1923  4 Sheets-Sheet 3

Inventors:
B. A. Peterson,
P. W. Cummings,
By Chindahl Parker Taulson
Attys.

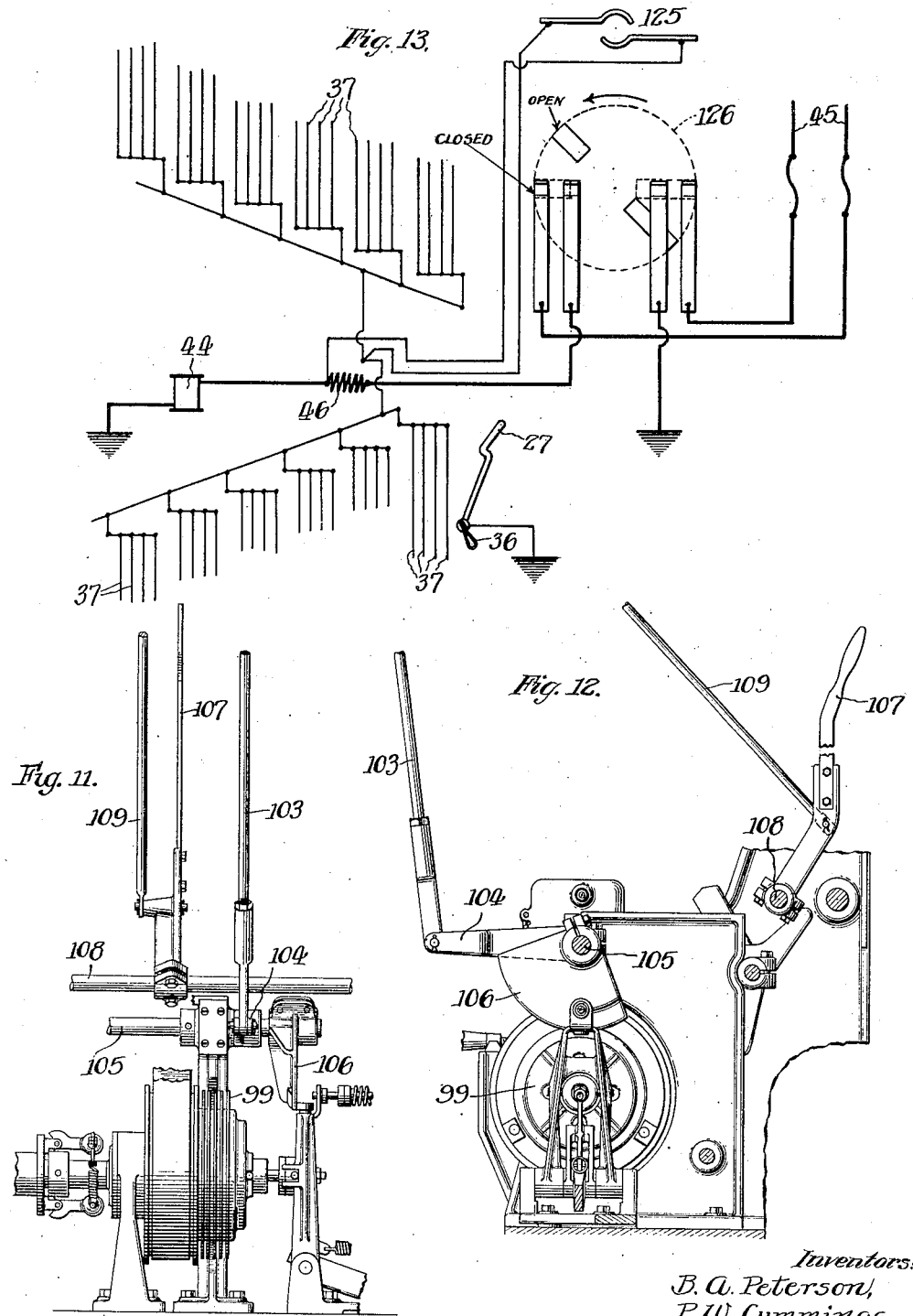

Patented Mar. 9, 1926.                                                              1,575,933

UNITED STATES PATENT OFFICE.

BURT A. PETERSON AND PRESTON W. CUMMINGS, OF ROCKFORD, ILLINOIS, ASSIGNORS TO BARBER-COLMAN COMPANY, OF ROCKFORD, ILLINOIS, A CORPORATION OF ILLINOIS.

WARPING APPARATUS.

Application filed December 31, 1923. Serial No. 683,563.

To all whom it may concern:

Be it known that we, BURT A. PETERSON and PRESTON W. CUMMINGS, citizens of the United States, residing at Rockford, in the county of Winnebago and State of Illinois, have invented a certain new and useful Warping Apparatus, of which the following is a specification.

In application Serial No. 190,501, filed September 10, 1917, by Howard D. Colman, (Patent No. 1,544,055, dated June 30, 1925), there is shown a creel and a warper the stoppage of which is controlled by means including a trip mechanism. The present invention is in the nature of an improvement upon said trip mechanism.

Figure 7:
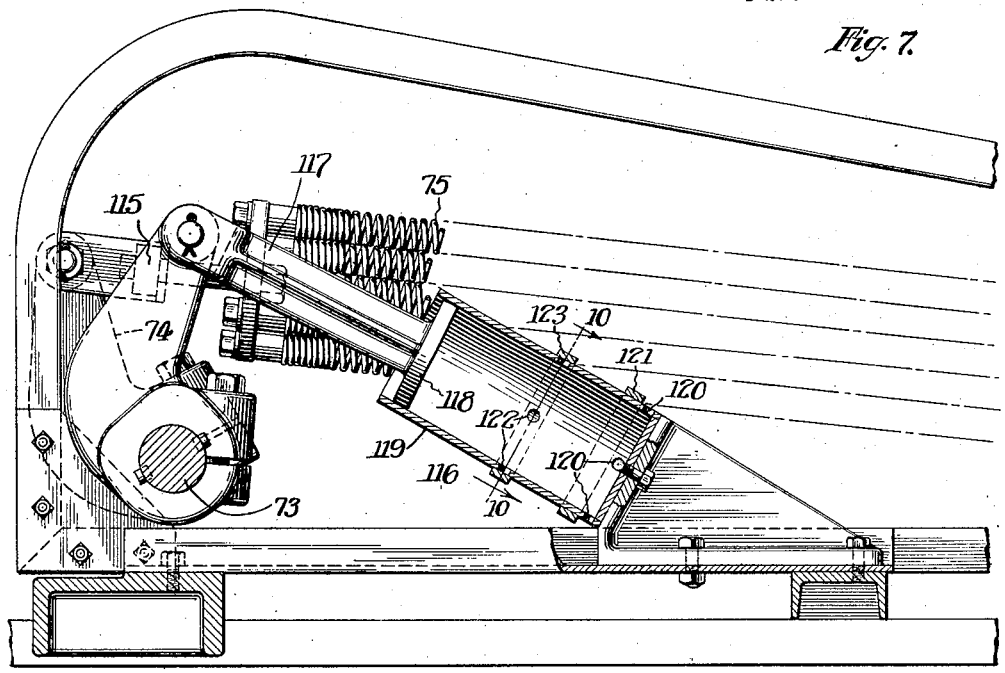
Figure 8:
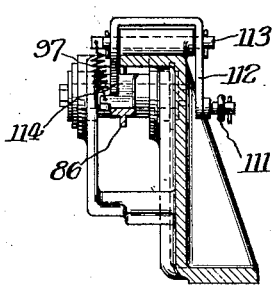
Figure 9:
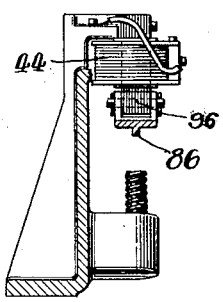
Figure 10:
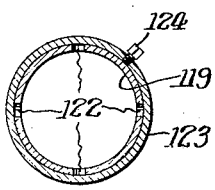

In the accompanying drawings Figure 1 is a plan view of the mechanism for operating the creel brakes, the warper brake and the warper clutch. Fig. 2 is a side elevation showing a portion of the operating connection between said mechanism and the warper. Fig. 3 is a side elevation of the trip mechanism, the view being taken in the plane of line 3—3 of Fig. 1. Fig. 3ª is a fragmental view of the lever 87, the bearings for the trunnions of said lever being indicated in dotted lines. Fig. 3ᵇ is a section on line b—b of Fig. 3. Fig. 4 is a plan view of the parts shown in Fig. 3. Fig. 5 is a section on line 5—5 of Fig. 4 on an enlarged scale. Fig. 6 is a section on line 6—6 of Fig. 5. Fig. 7 is a view on an enlarged scale taken in the plane of line 7—7 of Fig. 1. Fig. 8 is a section on line 8—8 of Fig. 3. Fig. 9 is a section on line 9—9 of Fig. 3. Fig. 10 is a section on line 10—10 of Fig. 7.

Fig. 11 is an end view of the warper clutch showing the operating connections. Fig. 12 is a side elevation of the same. Fig. 13 is a diagrammatic wiring plan of the electrical connections included in the mechanism.

While the framework of the creel may be of any suitable character, it is herein shown as consisting of two frames 6 and 7 (Fig. 1) arranged to form a V-shaped structure. The means for detecting exhaustion or excessive slackness of the yarn extending from the creel to the warp beam (not shown) comprises detectors 27 (Fig. 13), there being one detector for each supply yarn mass. The tension of thread normally holds the detector up against the action of gravity. When the detector 27 falls, a contact arm 36 attached to said arm swings into contact with an electric conductor 37. The various conductors 37 on the creel are electrically connected into the circuit of an electromagnet 44 which is normally energized. 45 are the line wires, and 46 is a resistance in the circuit of the electromagnet 44. The conductors 37 are connected into the circuit at a point between the resistance 46 and the magnet 44. When a shunt circuit is closed around the electromagnet 44 through the dropping of any one of the detectors 27, the electromagnet is deenergized sufficiently to release a detent which normally holds the brake mechanism of the creel and the warper inoperative. It will be understood that other means may be employed to deenergize the magnet 44.

The creel brakes are arranged to be operated by a rock shaft 73 supported on a suitable framework located on top of the creel. The means for turning the shaft 73 in the direction to apply the brakes comprises an arm 74 (Fig. 7) fixed upon said shaft, to which arm is anchored one end of a group of coiled contractile springs 75. The other end of the group of springs is adjustably connected to a fixed point, as indicated at 76 in Fig. 1. The springs 75 are normally restrained from turning the shaft 73 by means to be now described.

Fixed to the shaft 73 is an arm 82, the free end of which arm supports a ball 83. The ball 83 is contained within a socket or recess 84 (Fig. 5), the ball resting upon the upper end of an adjusting screw 85 which provides means for nicely adjusting the position of the ball. The socket 84 is of such form that the ball 83 may roll therein to a slight extent, the rear wall 86 of said socket being herein shown as cylindrically concave. A lever 87 is pivoted intermediate its ends by means of pivots or trunnions 88 (Fig. 3ᵇ) projecting from opposite sides of said lever, said pivots lying within bearing openings 89 formed in the supporting framework. These bearing openings are of larger diameter than the pivots 88, so that said pivots may roll within the bearing openings and thus support the lever 87 for free movement. The described pivotal mounting also obviates the necessity of lubricating the lever bearings.

One end of the lever 87 is forked and carries a pivot 90 (Fig. 5) on which is mounted a block 91. Pivotal movement of said block with relation to said lever is limited by means of a bolt 92 extending slidably through ears 93 on the lever 87 and the block 91. A coiled expansive spring 94 surrounds the bolt 92 and lies between the ears 93. On the lower portion of the outer side of the block 91 is a concave inclined surface 95 (Figs. 5 and 6), for engagement by the ball 83. The degree of inclination of the surface 95 may be varied by adjusting the bolt 92. The line of contact of the ball 83 with the block 91 is slightly above a straight line joining the line of contact of the ball and the surface 86 and the line of contact of the pivots 88 and their bearing openings 89. The higher the line of tangency of the surface 95 to the ball 83, the more sensitive will be the trip mechanism and the position of said line may be adjusted by means of the screw 85.

The opposite end of the lever 87 carries an armature 96 which is normally held by the electromagnet 44. A contractile spring 97 (Figs. 3 and 8) assists to hold the lever 87 in normal position. Below the armature-bearing arm of the lever 87 is a bumper spring 98 which yieldingly arrests the movement of the lever 87 when the armature 96 is released by the electromagnet 44.

It will be seen that when the electromagnet 44 is deenergized through the falling of any one of the detectors 27, the pressure of the ball 83 against the block 91 carried by the lever 87 will cause the forward end of said lever to swing up out of the way of said ball, whereupon the springs 75 are free to turn the shaft 73 in the direction to apply the creel brakes and the beam brake (not shown) and throw out the clutch 99 (Fig. 11) that drives the warper.

The tripping mechanism just described is extremely sensitive to the dropping of a detector, although capable of withstanding wear, and sufficiently rugged to restrain the powerful springs 75 under normal conditions. The ball 83 and the parts with which it is in contact are hardened to resist wear. Moreover, the rolling action of the ball 83 against the surfaces 86 and 95 is more favorable to durability than the snapping of one edge off another.

The lever 87 is pivoted in such a manner as to be very sensitive, the loose bearings for said lever permitting a rolling action and obviating the necessity of lubrication.

It will be apparent that the trip mechanism will cause prompt application of the brakes in the event that the supply of electric current is shut off or in case of a material fluctuation in the current.

The normally energized electromagnet 44 serves the same purposes as the electromagnets 44 and 103 disclosed in said Colman application Serial No. 190,501 (Patent No. 1,544,055).

The connection between the shaft 73 and the clutch 99 may be of any preferred character. Herein we have shown a rod 100 (Fig. 3) extending between the arm 82 and one arm of a bell crank lever 101 (Fig. 1). The lever 101 is pivotally mounted on a fixed shaft 102 (Fig. 2). The other arm of said bell crank lever is connected by means of a link 103 to an arm 104 (Fig. 12) fixed upon a rock shaft 105. Said shaft carries a cam 106 arranged to operate the clutch 99.

The means for manually causing an application of the brakes comprises a hand lever 107 (Fig. 12) which is pivoted on the warper at 108 and is connected by means of a link 109 to an arm 110 (Fig. 1) mounted to turn on the pivot shaft 102. Said arm is connected by means of a link 111 to an arm 112 (Fig. 8) which is pivoted at 113 in the framework of the resetting mechanism. Rigid with the arm 112 is an arm 114 that overlies the rear arm of the lever 87. It will be seen that by drawing forward the hand lever 107 (Fig. 12) the arm 114 may be caused to force the rear arm of the lever 87 downwardly far enough to release the arm 82, whereupon the springs 75 will cause the brakes to be applied.

Rigidly mounted upon the rock shaft 73 is an arm 115 (Fig. 7) arranged to operate a dashpot 116. Pivoted to the arm 115 is a rod 117 carrying a piston 118. Said piston is arranged to move within the dashpot cylinder 119 secured to the framework of the resetting mechanism. In the lower portion of the cylinder 119 is a suitable number of holes 120 for the entrance and escape of air. A ring 121 fits slidably upon the cylinder 119 and may be slid into position to close the holes 120 to a greater or less degree. A set screw or the like may be provided to hold the ring 121 in adjusted position. About midway of the length of the cylinder 119 another series of holes 122 is provided, which also may be closed to a greater or less extent by means of a ring 123 slidably mounted upon said cylinder and arranged to be secured in adjusted position by means of a set screw 124.

When the arm 82 is released, the action of the springs 75 is somewhat checked by the dashpot 116, thereby retarding the action of the creel brakes and giving a little more time for the application of the warper brake. The dashpot also acts as a safety stop device in case the brakes should be applied at a time when there are no tridents in the creel.

In order that the flow of current to ground shall be interrupted promptly after the arm 82 has been released, there is provided a switch 125 (Fig. 13) similar to the switch 109 fully described in said Colman application Serial No. 190,501 (Patent No. 1,544,055), said switch being opened when the shaft 73 turns to apply the brakes.

126 (Fig. 13) is a switch similar to the switch 152 disclosed in an application Serial No. 443,541, filed February 9, 1921, by Howard D. Colman. When the warper is stopped, the turning of the shaft 105 opens the switch 126.

The warper and the creel are both grounded and are electrically connected together through the steel operating links 103 and 109.

We claim as our invention:

1. A trip mechanism having, in combination, a spring-acuated arm provided with a socket, a ball in said socket, an adjusting screw carried by the socket to support the ball, said socket comprising a cylindrically concave wall against which the ball bears, a lever pivoted between its ends, said ball bearing against one arm of said lever, and an electromagnet normally holding the other arm of said lever.

2. A trip mechanism having, in combination, a spring-acuated arm provided with a socket, a ball arranged to roll in said socket, a lever pivoted between its ends, said ball bearing against one arm of said lever, and an electromagnet normally holding the other arm of said lever.

3. A trip mechanism having, in combination, a spring-actuated arm provided with a socket, a ball in said socket, an adjusting screw carried by the socket to support the ball, said socket comprising a cylindrically concave wall against which the ball bears, a lever against which said ball bears, and means to restrain said lever.

4. A trip mechanism having, in combination, a spring-actuated arm, a lever, a ball carried by one of said parts and bearing against the other, and an electromagnet normally restraining said lever.

5. A trip mechanism having, in combination, a spring-actuated member, a pivoted member, a ball carried by one of said members and bearing against the other member, means to restrain said pivoted member, means to adjust the position of the ball with reference to the member by which it is carried, and means to vary the position of the line of contact of said ball with the other member, the last-mentioned line of contact being at one side of a straight line joining the fulcrum of the pivoted member and the line of contact of the ball with the member by which it is carried.

6. A trip mechanism having, in combination, a spring-actuated member, a pivoted member, a ball carried by one of said members and bearing against the other member, means to restrain said pivoted member, and means to vary the position of the line of contact of said ball with said other member, the last-mentioned line of contact being at one side of a straight line joining the fulcrum of the pivoted member and the line of contact of the ball with the member by which it is carried.

7. A trip mechanism having, in combination, a spring-actuated member, a pivoted member, a ball carried by one of said members, a part carried by the other member in position to bear against said ball, means for varying the position of the line of contact of said ball with said member, and means to restrain said pivoted member.

8. A trip mechanism having, in combination, a spring-actuated member, a pivoted member, a ball carried by one of said members, a block pivoted on the other member and having an inclined surface against which the ball bears, and means for pivotally adjusting said block with reference to the member by which it is carried.

9. A trip mechanism having, in combination, a spring-actuated member, a pivoted member, a ball carried by one of said members and bearing against the other member, a bearing for said pivoted member permitting rolling, and means to restrain said pivoted member.

10. In a warping apparatus, a trip mechanism, a normally energized electromagnet for restraining said trip mechanism, a resistance in the circuit of said electromagnet between the electromagnet and the source of supply of current, a grounded detector, and a conductor connected into the circuit of the eletromagnet intermediate the latter and said resistance, said detector being arranged to ground said conductor whereby to deenergize the electromagnet sufficiently to release the trip mechanism.

11. In a warping apparatus, a trip mechanism, a normally energized electromagnet for restraining the trip mechanism, and a detector for closing a shunt circuit to ground around said electromagnet whereby to deenergize said magnet sufficiently to release the trip mechanism.

12. In a warping apparatus, means tending to stop the apparatus, a trip mechanism normally restraining said stopping means, and a dashpot to check the action of said stopping means when released to action.

In testimony whereof we have hereunto affixed our signatures.

BURT A. PETERSON.
PRESTON W. CUMMINGS.